(12) United States Patent
Malzbender

(10) Patent No.: US 7,057,662 B2
(45) Date of Patent: Jun. 6, 2006

(54) RETRACTABLE CAMERA APPARATUS

(75) Inventor: Thomas Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 10/302,513

(22) Filed: Nov. 22, 2002

(65) Prior Publication Data

US 2004/0100575 A1    May 27, 2004

(51) Int. Cl.
*H04N 5/225* (2006.01)
*H04N 7/14* (2006.01)

(52) U.S. Cl. .................................. 348/373; 348/14.16

(58) Field of Classification Search ............ 348/14.01, 348/14.04, 14.16, 373–376; 248/187.1, 918; D16/200, 214, 242
See application file for complete search history.

(56) References Cited

U.S. PATENT DOCUMENTS

| | | | |
|---|---|---|---|
| 4,032,940 A | | 6/1977 | Chan |
| 4,485,400 A | * | 11/1984 | Lemelson et al. ........ 348/14.01 |
| 4,928,300 A | * | 5/1990 | Ogawa et al. ........... 348/14.01 |
| 5,666,153 A | | 9/1997 | Copeland |
| 5,675,374 A | * | 10/1997 | Kohda ....................... 348/14.1 |
| 5,864,363 A | | 1/1999 | Giefing et al. |
| 6,172,703 B1 | * | 1/2001 | Lee .......................... 348/14.08 |
| 6,208,373 B1 | * | 3/2001 | Fong et al. .............. 348/14.16 |
| 6,259,470 B1 | * | 7/2001 | Koizumi et al. ........... 348/14.1 |
| 6,812,958 B1 | * | 11/2004 | Silvester .................. 348/207.1 |
| 2002/0024611 A1 | * | 2/2002 | Watanabe et al. ........... 348/373 |
| 2002/0194792 A1 | * | 12/2002 | Feldpausch et al. ......... 52/36.1 |
| 2003/0218672 A1 | * | 11/2003 | Zhang et al. ............. 348/14.16 |

FOREIGN PATENT DOCUMENTS

| | | | |
|---|---|---|---|
| JP | 07099644 A | * | 4/1995 |
| JP | 07162827 A | * | 6/1995 |

OTHER PUBLICATIONS

IBM Technical Disclosure Bulletin—"Video Camera Mounting Apparatus for Personal Computers"—vol. 36 No. 9A—Sep. 1, 1993—pp. 463-464.

* cited by examiner

*Primary Examiner*—David Ometz
*Assistant Examiner*—Timothy J. Henn

(57) ABSTRACT

A retractable camera apparatus is disclosed. Through the use of the apparatus, a video teleconference environment can communicate, in real time, such personal features as gesture, expression and body language. The apparatus includes a housing portion, at least one arm portion coupled to the housing portion wherein the at least one arm portion is capable of being moved between a retracted position and a deployed position and a plurality of cameras coupled to the at least one arm portion.

27 Claims, 7 Drawing Sheets

RETRACTABLE CAMERA APPARATUS

CROSS REFERENCE TO RELATED APPLICATIONS

The present invention is related to co-pending application Ser. No. 10/176,494 entitled "Method and System for Real-Time Video Communication Within a Virtual Environment" which is incorporated herein by reference.

FIELD OF THE INVENTION

The present invention relates generally to video teleconferencing, and more particularly to a retractable camera apparatus for enabling real-time video communication within a shared virtual environment.

BACKGROUND OF THE INVENTION

Video teleconferencing systems enable two or more parties to participate in remote conversation with accompanying near real-time video. For an understanding of a conventional video teleconferencing system, please refer now to FIG. 1. As shown in FIG. 1, in a conventional video teleconferencing system, a local participant communicates by means of a teleconferencing station 10. For processing the video portion of the conversation, each teleconferencing station includes a display device 12, i.e., a monitor, for displaying the other party/parties to the conversation, and a video camera 14 for transmitting video to the other parties to the conversation. The video camera 14 is typically mounted just above the display 12.

One of the problems associated with video teleconferencing is the lack of eye contact between participants. Typically, participants interact with the display for communicative purposes instead of the recording camera that is positioned to capture a video image of the local participant. Interest of the local user is focused primarily on the display for communication. Users typically interact with images of participants on the display by talking to and gazing at the participant located on the display.

Since the video camera can not physically be positioned exactly at the location of interest of the local participant, (i.e. the center of the display 12) the remote participant will not see a face-on view of the local participant. The local user appears to be avoiding eye contact by gazing off in another direction. Moreover, the same problem exists at the display of the local user since the local user also views a video stream of the remote participant that is not face-on.

One approach that has been explored in solving the problem of the lack of eye contact is to display a model of the facial features of a participant in a static synthetic environment. In this way, a model of the participant is created that is face-on. The model is created by substituting various facial features of the participant for the actual state of the facial feature. The facial features that are substituted can be created from sample images of the participant. For example, a mouth can be in various emotional states i.e. a smile, a pursed lip, etc. As the participant smiles and frowns in real time, a model is generated to reflect the smiles and frowns and is presented to the other participants.

However, the limitation of this approach is evident especially when errors in interpreting the visual features of the participant are displayed. For example, if a mouth of a participant is actually smiling but a pursed lip is detected, then the model of the participant would display the pursed lip. Although the accompanying audio stream and other facial features may not correspond to the errant display of a pursed lip, the model would not appear to be in error, since all the facial features are reconstructed from actual images. A viewer of the model therefore would be unable to determine if an error occurred.

Moreover, because of current limitations of computing resources, in order for real-time display of the model to occur for real-time video teleconferencing, for simplicity only a few features are reconstructed for exhibiting emotion. As such, the model may not appear realistic to the viewing participant. Also, since the model is reconstructed from sample images, the actual image of the participant is not transmitted to the viewing participant. As such, subtleties in emotion exhibited by the facial features cannot be represented by a model if the sample images do not contain emotion, or if the reconstructed facial features do not encompass the facial feature of interest.

Accordingly, what is needed is a video teleconferencing apparatus that addresses the shortcomings of the existing technology. The apparatus should be simple, cost effective and capable of being easily adapted to existing technology. The present invention addresses these needs.

SUMMARY OF THE INVENTION

A retractable camera apparatus is disclosed. Through the use of the apparatus in accordance with the present invention, a video teleconferencing environment can communicate, in real time, such personal features as gesture, expression and body language. Additionally, the retractable nature of the camera apparatus allows a user to place the apparatus into a retracted position whereby the apparatus is effectively out of the user's way when the apparatus is not being utilized.

A first aspect of the invention includes a retractable camera apparatus. The apparatus includes a housing portion, at least one arm portion coupled to the housing portion wherein the at least one arm portion is capable of being moved between a retracted position and a deployed position and at least one camera coupled to the at least one arm portion.

A second aspect of the present invention includes a system for capturing images. The system comprises a desktop video display and a retractable camera apparatus coupled to the desktop video display wherein the retractable camera apparatus comprises apparatus includes a housing portion, at least one arm portion coupled to the housing portion wherein the at least one arm portion is capable of being moved between a retracted position and a deployed position and at least one camera coupled to the at least one arm portion.

Other aspects and advantages of the present invention will become apparent from the following detailed description, taken in conjunction with the accompanying drawings, illustrating by way of example the principles of the invention.

DETAILED DESCRIPTION

The present invention relates to a retractable camera apparatus. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Accordingly, an embodiment of the present invention is an apparatus for facilitating real-time video communication in a virtual environment. The apparatus is utilized to generate video streams of a local participant. These video streams are utilized in conjunction with view synthesis techniques to generate real-time video images of the local participant to be observed by remote participants during a video communication session.

Figure 1:
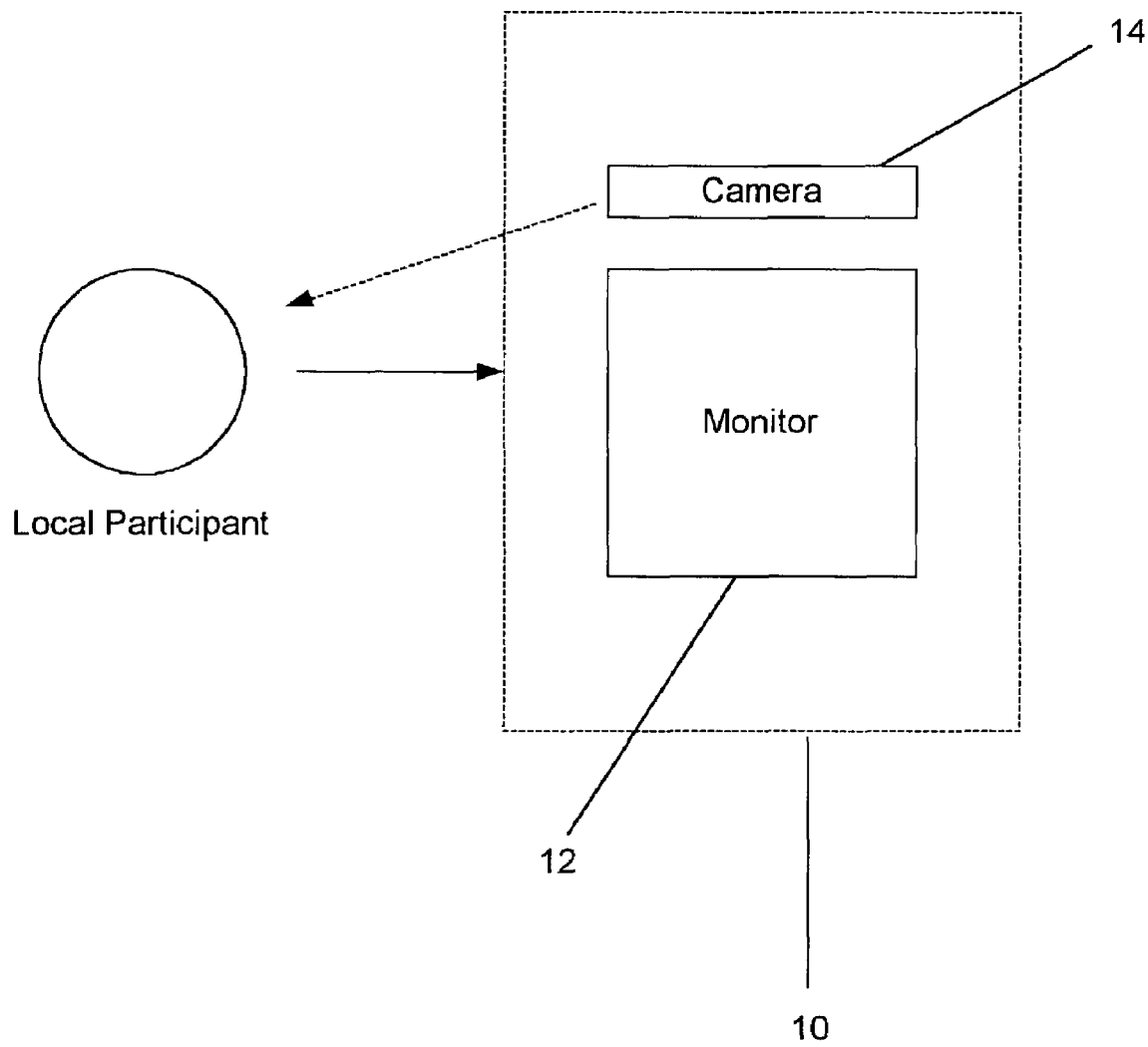
FIG. 1 illustrates a conventional video teleconferencing system
Figure 2A:
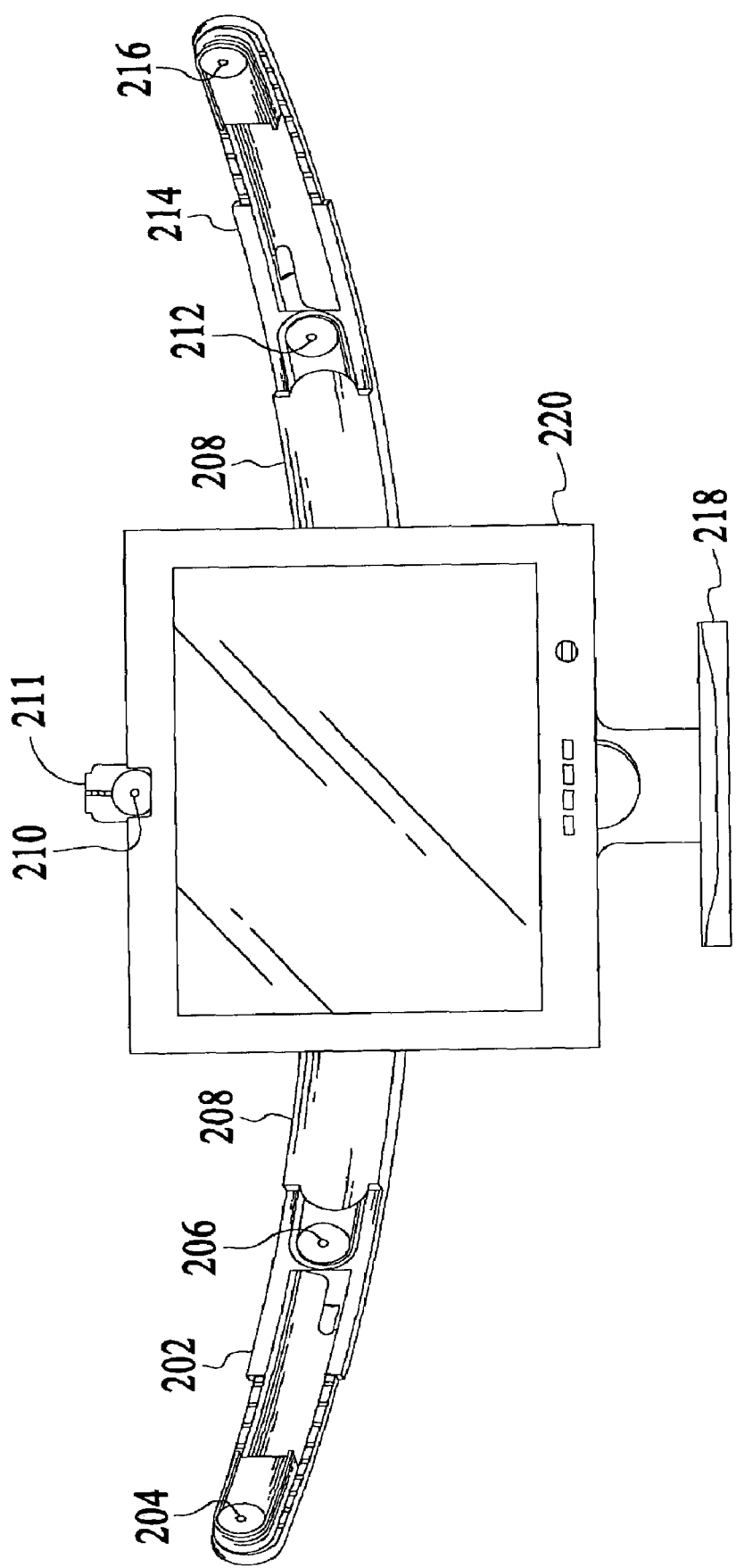
FIG. 2A shows a front perspective view of an apparatus in accordance with an embodiment the present invention.

FIG. 2A is an illustration of apparatus 200 in accordance with an embodiment of the present invention. The apparatus 200 includes three arm portions 202, 211, 214, a central housing portion 208, and a base portion 218. Exterior arm portions 202, 214 are each retractably coupled to the central housing portion 208 and the central housing portion 208 is coupled to the base portion 218. A central arm portion 211 is also coupled to the central housing portion 208.

Figure 2B:
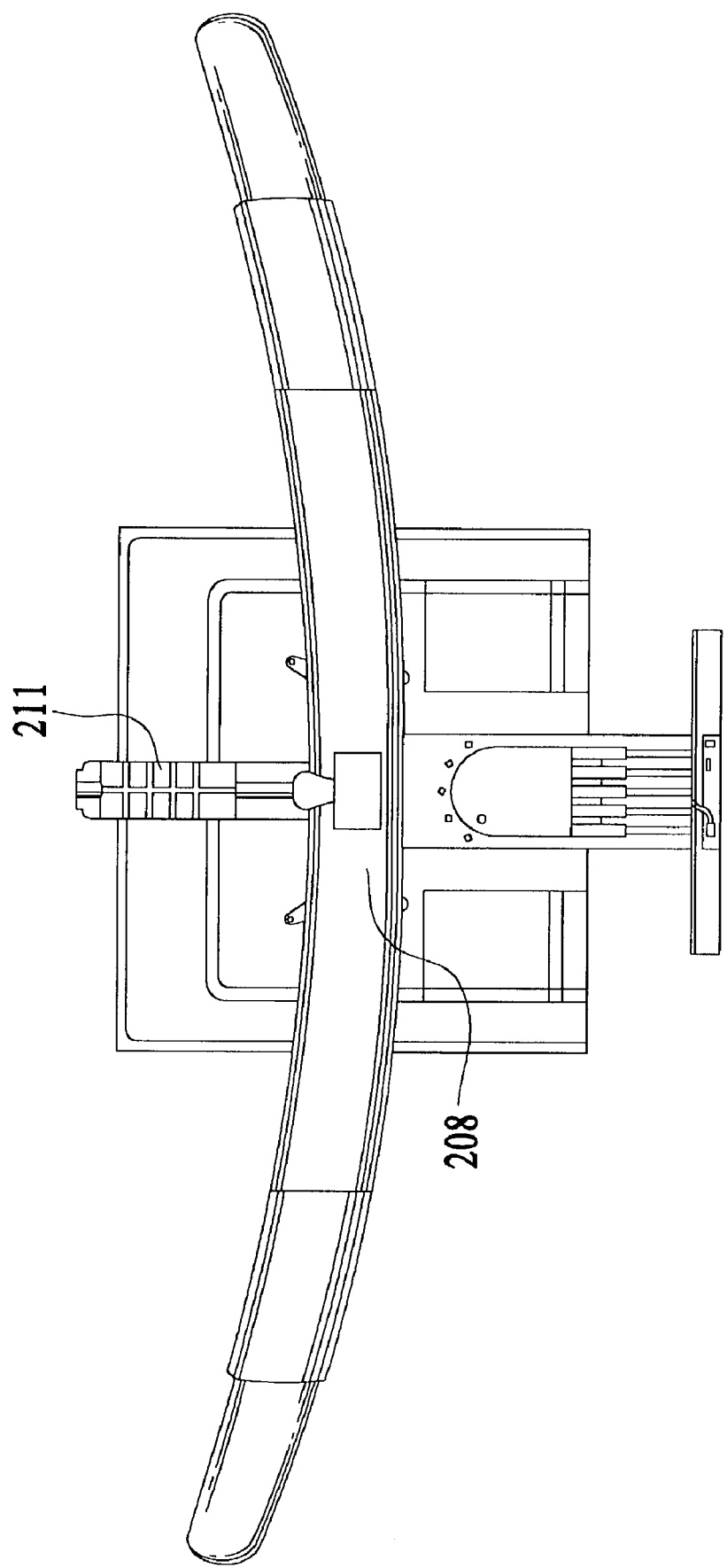
FIG. 2B shows a rear perspective view of the apparatus in accordance with an embodiment of the present invention.

For a better understanding of the apparatus in accordance with an embodiment of the present invention, please refer now to FIG. 2B. FIG. 2B is a rear perspective view of an embodiment of the apparatus 200 in accordance with the present invention. As can be seen in FIG. 2B, the central arm portion 211 is coupled to the central housing portion 208. In an embodiment, the apparatus 200 is comprised of a material such as plastic or the like.

Referring back to FIG. 2A, the apparatus 200 is capable of being coupled to a desktop video display. In the embodiment shown in FIG. 2A, the desktop video display is a flat-panel desktop video display 220. The apparatus 200 further includes a plurality of digital cameras 204, 206, 210, 212, 216. In an embodiment, two cameras 204, 206 are coupled to the first exterior arm 202 and two cameras 212, 216 are coupled to the second exterior arm 214. A fifth camera 210 is coupled to the central arm 211.

It should be noted that although the embodiment is shown in conjunction with a flat-panel desktop video display 220, one skilled in the art will readily recognize that the apparatus 200 in accordance with the present invention could be configured for a variety of different video displays while remaining within the spirit and scope of the present invention.

Figure 2C:
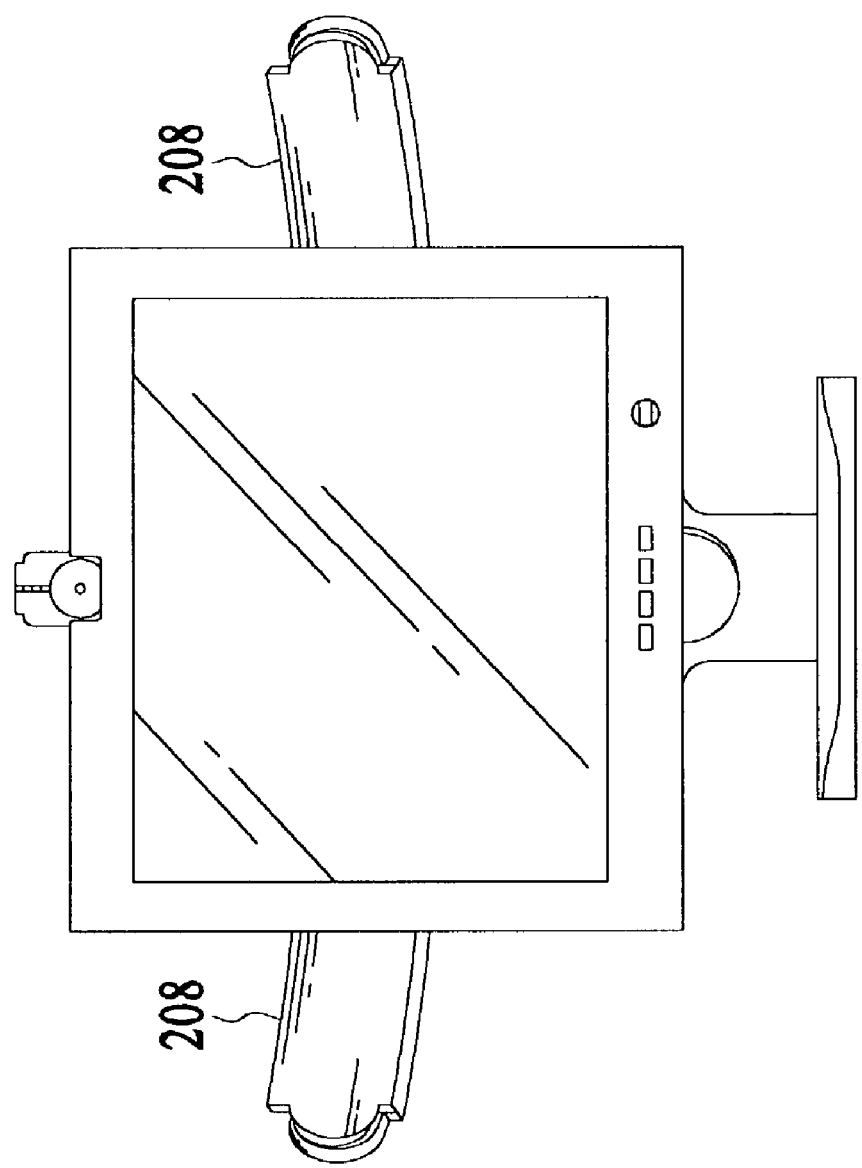
FIG. 2C shows the apparatus in a retracted position in accordance with an embodiment of the present invention.

In an embodiment of the present invention, the exterior arms 202, 214 can be movably retracted into the central housing portion 208. Accordingly, the apparatus 200 is capable of being placed into a deployed position and a retracted position. In an embodiment, the deployed position is the position shown in FIG. 2A. In the deployed position, the arms 202, 214 extend from opposite sides of the central housing portion 208 such that cameras 204, 206, 212, 214 are capable of capturing an image in front of the display 220. Conversely, in the retracted position, the arms 202, 214 are movably retracted into the central housing portion 208. FIG. 2C shows the apparatus 200 in a retracted position wherein the arms (not seen) have been movably retracted into the central housing portion 208. The retractable nature of the exterior arms 202, 214 allows a user to place the apparatus 200 into the retracted position whereby the apparatus 200 is effectively out of the user's way when the apparatus 200 is not being utilized.

Figure 2D:
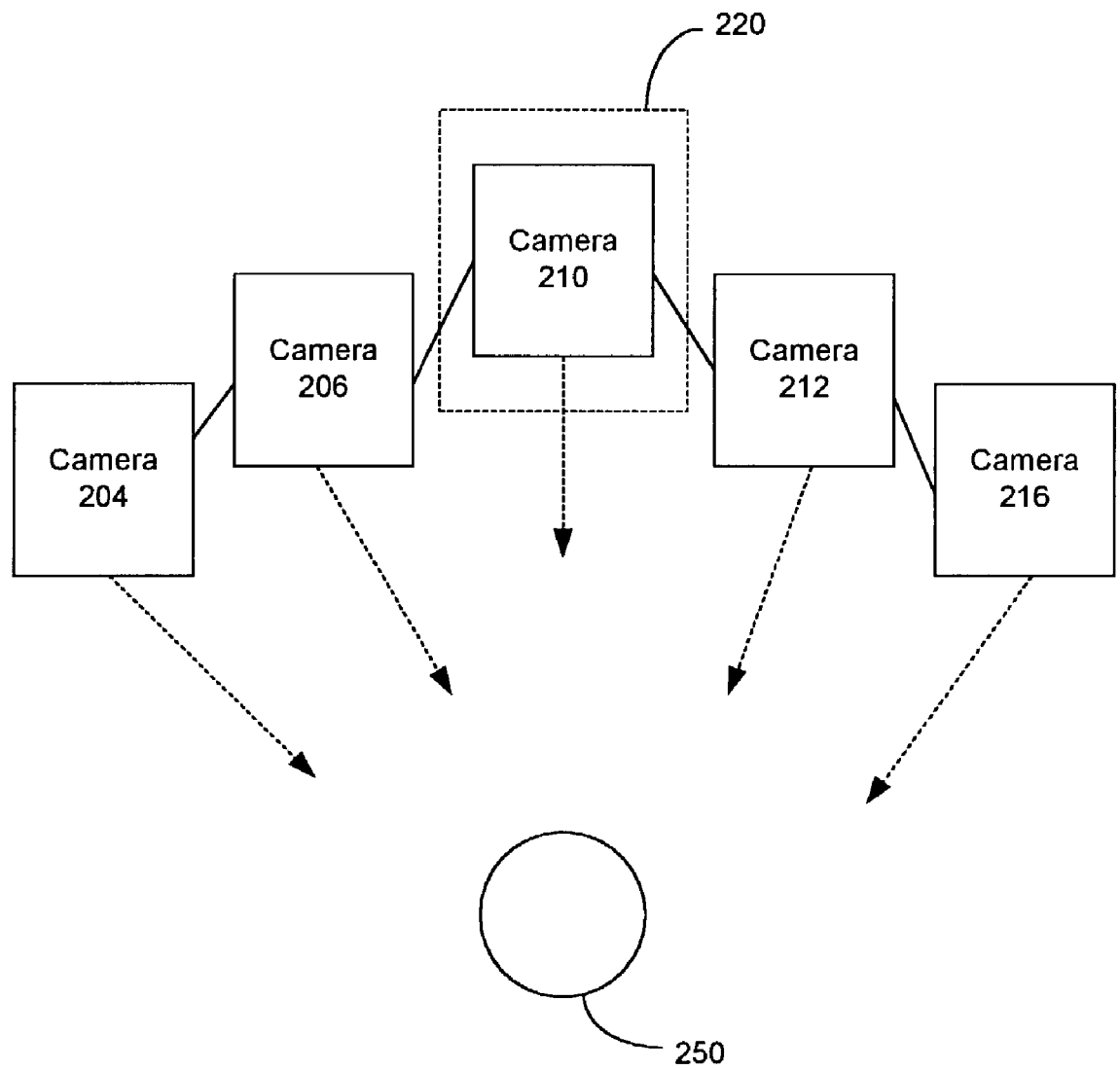
FIG. 2D is a top perspective view of the apparatus in accordance with an embodiment of the present.

Please refer now to FIG. 2D. FIG. 2D shows a top perspective view of the apparatus in accordance with an embodiment of the present invention. As can be clearly seen in FIG. 2D. The five digital cameras 204, 206, 210, 212, 216 all face and wrap around a local participant 250. The local participant 250 faces the five cameras 204, 206, 210, 212, 216. In an embodiment, the apparatus 200 produces five video streams in real-time from multiple perspectives via the five digital cameras 204, 206, 210, 212, 216. From these multiple video streams, view synthesis methods can be implemented to generate new views of the local participant from arbitrary perspectives. Generation of the new views occur in real-time to provide for real-time video communication within the virtual environment.

Although five separate cameras are used in the present embodiment, it is possible to increase or decrease the number of cameras depending on the desired image quality. In an embodiment, the cameras are five low-cost, small-format digital cameras. However, one of ordinary skill in the art will readily recognize that a variety of different cameras could be employed in conjunction with the present invention while remaining within the spirit and scope of the present invention.

In an alternate embodiment of the present invention, the apparatus 200 further includes audio capability. This involves the utilization of one or more small microphones that are coupled to the apparatus 200. For example, the microphone(s) could be coupled to one or all of the arm portions 202, 211, 214 or to the central housing 208. Each microphone(s) is capable of receiving audio input in real-time. Accordingly, the audio input can be combined with the video streams in order to effectuate audio and video communicative interaction with other observing participants in, for example, a video teleconferencing environment.

Additionally, to further accommodate communicative interaction with other observing participants, an alternate embodiment of the present invention includes one or more speakers coupled to the apparatus 200 for transmitting audio input received from other observing participants in the video teleconferencing environment.

In yet another embodiment of the present invention, the apparatus 200 is designed to be coupled to and utilized in conjunction with an operating system on a computer system and in connection with a server. However, while the apparatus 200 is described in the general context of being employed in conjunction with an operating system on a computer system and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

Figure 3:
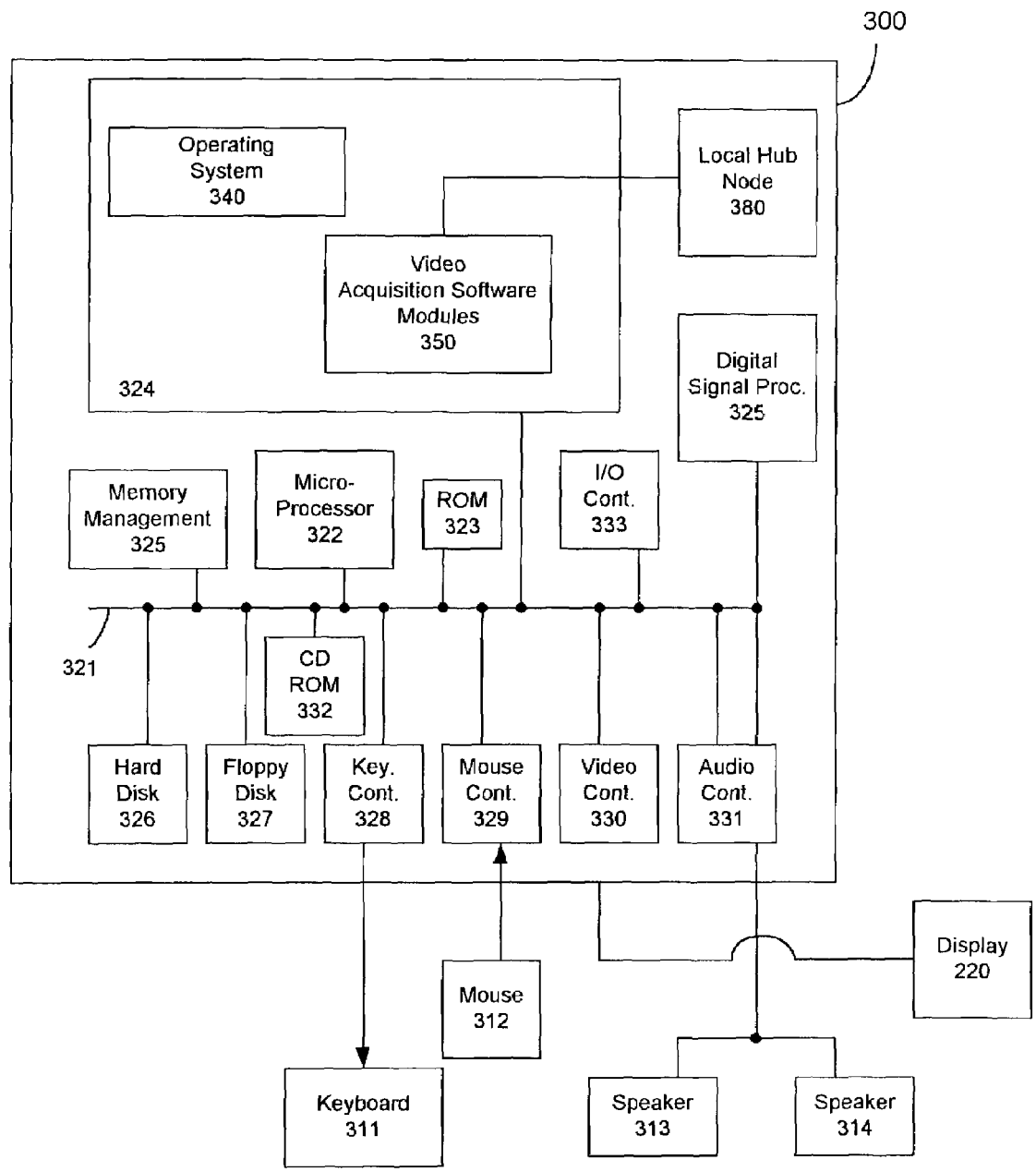
FIG. 3 shows an example of a computer system that could be utilized in conjunction with the apparatus in accordance with an embodiment of the present invention.

For an example of a computer system that could be utilized in conjunction with the apparatus in accordance with the present invention, please refer to FIG. 3. In FIG. 3, a computer system 300, including, a keyboard 311, a mouse 312 and a display 220 (FIG. 2A) are depicted in block diagram form. The system 300 includes a system bus or plurality of system buses 321 to which various components are coupled and by which communication between the various components is accomplished. The microprocessor 322 is connected to the system bus 321 and is supported by read only memory (ROM) 323 and random access memory (RAM) 324 also connected to the system bus 321. A microprocessor is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 323 contains, among other code, the Basic Input-Output system (BIOS) which controls basic hardware operations such as the interaction of the processor and the disk drives and the keyboard. The RAM 324 is the main memory into which the operating system 340 and video acquisition software modules 350 are loaded. The memory management chip 325 is connected to the system bus 321 and controls direct memory access operations including, passing data between the RAM 324 and hard disk drive 326 and floppy disk drive 327. The CD ROM 332 also coupled to the system bus 321 is used to store a large amount of data, e.g., a multimedia program or presentation.

Also connected to this system bus 321 are various I/O controllers: the keyboard controller 328, the mouse controller 329, the video controller 330, and the audio controller 331. As might be expected, the keyboard controller 328 provides the hardware interface for the keyboard 311, the mouse controller 329 provides the hardware interface for mouse 312, the video controller 330 is the hardware interface for the display 220, and the audio controller 331 is the hardware interface for the speakers 313, 314. An I/O controller 333 such as a Token Ring Adapter enables communication over a network to other similarly configured data processing systems.

In an embodiment, the invention may also be utilized in conjunction with a distributed computing environment where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

Please refer back to FIG. 3. In order to accommodate the distributed computing environment, a local hub node 380 is utilized for coordinating with a central host responsible for session management. For example, the local hub node 380 contacts a central host to either join an existing communication session within the virtual environment or create a new communication session. In the case where the local is joining an existing session, the central host notifies each of the local hub nodes located at the portals for those participating in the communication session that there is a new participant. The new portal location (the local hub node) is initialized and from then on all participants of a communication session notify each other of any position updates in the virtual environment. This can be done on a peer-to-peer connection to facilitate real-time interaction within the virtual environment.

Figure 4:
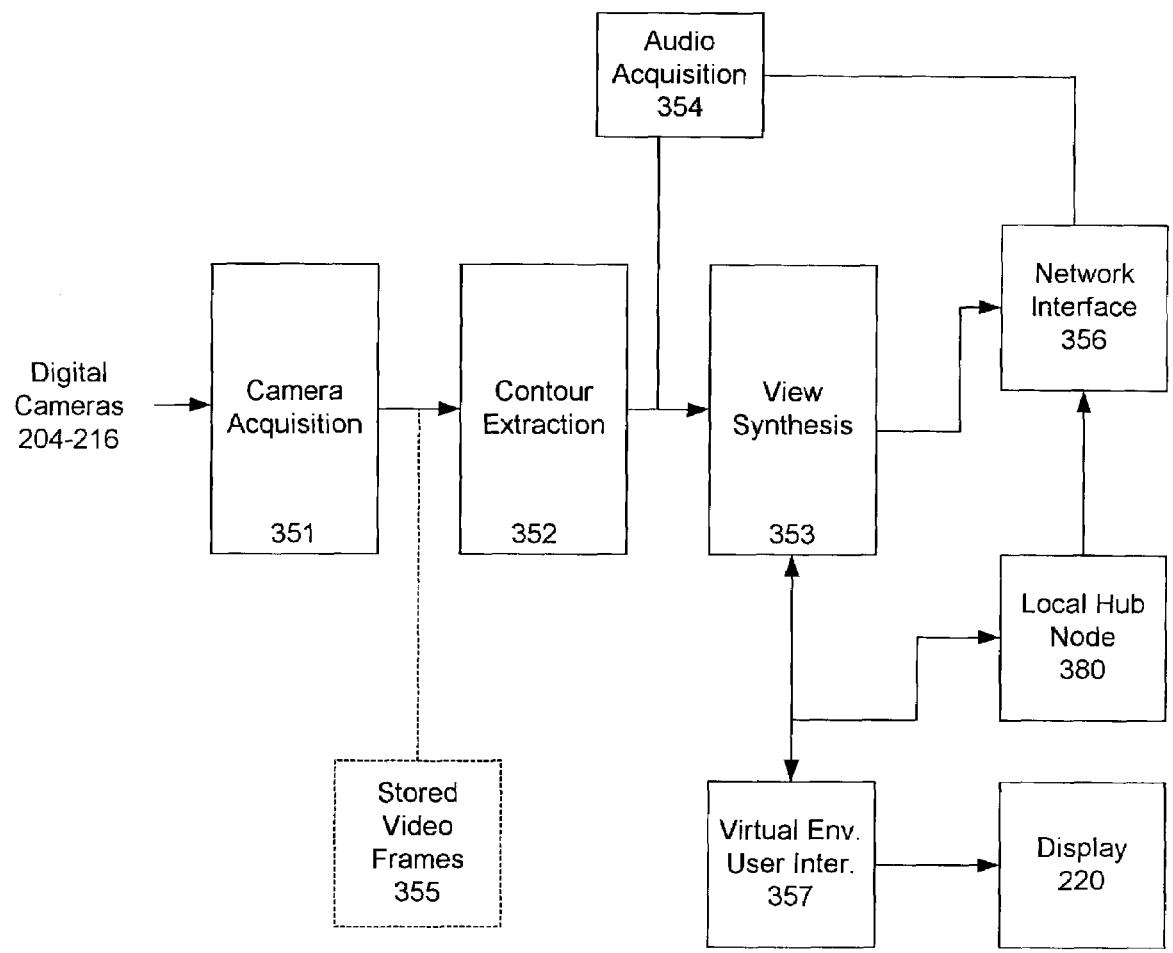
FIG. 4 shows a more detailed illustration of video acquisition software modules in accordance with an embodiment of the present invention.

For a better understanding of the invention, please refer now to FIG. 4. FIG. 4 is a more detailed illustration of video acquisition software modules 350 that could be utilized in conjunction with an embodiment of the present invention. The video acquisition software modules 350 include camera acquisition modules 351, contour extraction module 352, view synthesis module 353, an audio acquisition module 354, an optional stored video frames 355, a network interface module 356 and a virtual environment user interface module 357.

The camera acquisition modules 351 receive video streams from cameras 204–216. The contour extraction module 352 segments or separates out the local participant from each of the real-time video streams coming out of each of the cameras 204–216. Optional module 355 may store video frames that are generated from the cameras 204–216 for alternative sources of video streams to be inputted into the contour extraction module (e.g. for debugging purposes). The local participant in the foreground is separated from the physical background by each of the video streams being received by the cameras 204–216. In this way, the local participant is segmented out from his background in the physical world. Using view synthesis techniques, a three-dimensional model of the local participant is generated from a new view that is associated with an observing participant. Thereafter, an image-based representation of the three-dimensional model can be virtually placed into a synthetic or virtual environment for communicative interaction with other observing participants.

Contour extraction is performed separately on each of the video streams that are received from the camera acquisition module 351. For example, contour extraction is performed within contour extraction module 352 on the real time video stream outputted by camera 204, as well as the stored video frames from module 355. Additionally, contour extraction is performed within contour extraction module 352, on the real time video stream outputted by camera 206, as well as the stored video frames from module 355. The same is true for the video streams received from cameras 210, 212, 216.

In order to segment the foreground from the physical background, the apparatus 200 goes through a calibration stage. Initially, the first stage of operation is camera calibration. This operation allows the extraction of both intrinsic and extrinsic camera parameters for each of the cameras 204–216. Intrinsic parameters are internal to each video camera and include a quantification of the lens distortion parameters, focal length, field of view, aspect ratio, and color sensitivity. Extrinsic parameters include the camera pose, which is the orientation and position of each camera acquisition module in relation to the local participant (e.g. participant 250 in FIG. 3).

Next, multiple images are collected without a foreground participant present to build a background model for each pixel in each camera. This data may be stored in module 355 for purposes of contour extraction. The model is a statistical characterization that specifies what the means and standard deviations for each color channel are at each sensor element when viewing the background. This allows for the segmentation of the user from the background in each of the camera views. Other background models can easily be implemented, such as, multimodal representations of color statistics, and mixtures of Gaussian distribution functions.

The view synthesis module 353 is employed for generating new views of the local participant from the perspective of other remote, observing participants within the virtual environment. For each observing participant, their perspective is associated with a direction from the local participant to the respective observing participant within a coordinate space of the virtual environment. A new view of the local participant is generated for each of the observing participants. The new views of the local participant are generated in real-time. For example, if there are m observing participants, m new views of the local participant are generated, one from each of the perspective of the m observing participants.

Construction of each of the m new views is done with various view synthesis techniques. The view synthesis techniques reconstruct, from the various real-time video streams of the local participant taken from the multiple sample perspectives, a new view taken from a new and arbitrary perspective, such as, the perspective of an observing participant in the virtual environment. The new view of the local participant is able to capture eye-to-eye contact between the local participant and the observing participant The new view of the local participant is then rendered from the reconstruction.

An intermediate step includes rendering a three dimensional model of the local participant from the perspective of the observing participant. The three-dimensional model is generated from the various real-time video streams of the local participant. The model is rendered in two dimensions for blending within a three-dimensional synthetic rendering of the virtual environment.

For example, within the view synthesis module 353, an output of a new view from the perspective of a first observing participant is reconstructed from video streams from each of the multiple sample perspectives associated with the cameras 204–216. The real-time video streams from each of the sample perspectives have extracted the local participant from the physical background in contour extraction module 352, and are inputted into view synthesis module 353.

Correspondingly, the view synthesis module 353 outputs a new video image stream of the local participant from the perspective of a second observing participant in the virtual environment. Each of the new video streams from the perspective of observing participants are reconstructed from video streams from each of the multiple sample perspectives associated with the cameras 204–216 that have extracted the local participant from the physical background.

In an embodiment, video acquisition software modules 350 also include an audio acquisition module 354. Module 354 can include a microphone for receiving audio input in real-time of the local participant. The audio input can be combined with the video streams from the perspectives of the observing participants to generate photo-realistic renderings of the local participant for real-time interaction in the network interface module 356.

From module 356, the video and audio streams can be sent directly to the corresponding observing participants over a peer-to-peer communication connection. The peer-to-peer communication minimizes the amount of processing on the audio/video data to ensure real-time interaction.

In addition, video acquisition software modules 350 also include a virtual environment user interface module 357. Module 357 provides for local participant interaction within the virtual environment. Each participant can control the virtual position within the virtual environment of an associated virtual avatar that represents that participant. Although the embodiment uses the mouse or the cursor keys to move the local participant throughout the virtual environment, other input modalities can be used as well. For example, user interface module 357 can be used to effect movement of the virtual avatar representing the local participant within the virtual environment. Also, user interface module 357 can be used to rotate the virtual avatar representing the local participant about a vertical axis in the virtual environment. This defines an orientation of the virtual avatar representing the local participant within a coordinate system of the virtual environment. This allows the local participant to get various viewpoints encompassing 360 degrees at a particular location within the virtual environment.

In addition, module 357 receives the input audio streams and corresponding video image streams associated with the observing participants that are communicating with the local participant within the virtual environment. The input audio streams and corresponding video image streams are sent from the observing participants. A separate audio stream and corresponding video image streams is generated of each of the observing participants from the perspective of the local participant within the virtual environment, and is associated with a direction of the local participant from the respective observing participant within the coordinate space of the virtual environment. These audio streams and video image streams can be generated on systems that are located at each of the physical locations of the observing participant. In this way, each of the participants within a virtual environment can participate in a communication session although they may be physically located in remote locations.

The display 220 is coupled to the user interface module 357 and is utilized for viewing the virtual environment from the perspective of the local participant. Depending on the orientation of the local participant, each of the video streams from the observing participants can be viewed on the display 220. Due to limited field of view of the display 220, warpings and deformation of the virtual space as shown on the display 220 will allow wider views of the virtual environment. Although this may introduce geometric inconsistencies between the virtual world and the physical display, photo-realistic images of the participants are still ready available, such as eye-to-eye contact within that distorted space.

Accordingly, since the present invention generates the perception of eye contact between the local participant and remote observing participants, natural communication is preserved between the participants of a communication session. For example, emotional displays of the local participant are picked up by the cameras 204, 206, 210, 212, 216 and are sent to the other participants in the communication session for photo-realistic display with corresponding avatars. Nervousness that is associated with purposeful dodging of eye contact is also preserved. This enables real-time video communication between the local participant and the plurality of observing participants within the communication session contained in the virtual environment.

A retractable camera apparatus is disclosed. Through the use of the apparatus in accordance with the present invention, a video teleconferencing environment can communicate, in real time, such personal features as gesture, expression and body language. Additionally, the retractable nature of the apparatus allows a user to place the apparatus into a retracted position whereby the apparatus is effectively out of the user's way when the apparatus is not being utilized.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A retractable camera apparatus comprising:
   a housing portion;
   at least one arm portion coupled to the housing portion wherein the at least one arm portion is capable of being moved between a retracted position and a deployed position; and
   a plurality of cameras coupled to the at least one arm portion, wherein the retracted position comprises a position in which at least two of the cameras are moveably retracted into the housing portion.

2. The apparatus of claim 1 wherein the deployed position comprises a position in which the at least one arm portion is movably extended from the housing portion such that the plurality of cameras are capable of capturing an image in front of the apparatus.

3. The apparatus of claim 2 wherein the retracted position comprises a position in which the at least one arm portion is moveably retracted into the housing portion.

4. The apparatus of claim 1 wherein the at least one arm portion includes a central arm portion coupled to the housing portion and the plurality of cameras comprise three cameras wherein one of the three cameras is coupled to the central arm portion.

5. The apparatus of claim 4 wherein the retracted position comprises a position in which two of the three cameras are moveably retracted into the housing portion.

6. The apparatus of claim 1 wherein the at least one arm portion includes a central arm portion coupled to the housing portion and the plurality of cameras comprise five cameras wherein one of the five cameras is coupled to the central arm portion.

7. The apparatus of claim 6 wherein the at least one arm portion further includes two exterior arm portions and two of the five cameras are coupled to one of the two exterior arm portions and two of the five cameras are coupled to the other of the two exterior arm portions and the deployed position comprises a position in which two of the five cameras are positioned on one side of the housing portion and two of the five cameras are positioned opposite the one side of the housing portion such that each of the five cameras is capable of capturing an image in front of the apparatus.

8. The apparatus of claim 7 wherein the retracted position comprises a position in which four of the five cameras are moveably retracted into the housing portion.

9. The apparatus of claim 1 wherein the plurality of cameras record a real-time video stream of an image in front of the apparatus and the apparatus is coupled to a computer system wherein the computer system includes:
   a view synthesis module for generating a plurality of output video image streams by applying a view synthesis technique to each real-time video streams; and
   a contour extraction module for extracting the image from a physical background.

10. The apparatus of claim 1 wherein the housing portion is capable of being coupled to a desktop video display.

11. The apparatus of claim 10 wherein the desktop video display comprises a flat-panel display.

12. A system for capturing images comprising:
    a desktop video display; and
    a retractable camera apparatus coupled to the desktop video display wherein the retractable camera comprises;
    a housing portion;
    at least one arm portion coupled to the housing portion wherein the at least one arm portion is capable of being moved between a retracted position and a deployed position; and
    a plurality of cameras to the at least one arm portion, wherein the retracted position comprises a position in which at least two of the cameras are moveably retracted into the housing portion.

13. The system of claim 12 wherein the deployed position comprises a position in which the at least one arm portion is movably extended from the housing portion such that the plurality of cameras are capable of capturing an image in front of the apparatus.

14. The system of claim 13 wherein the retracted position comprises a position in which the at least one arm portion is moveably retracted into the housing portion.

15. The system of claim 12 wherein the at least one arm portion includes a central arm portion coupled to the housing portion and the plurality of cameras comprise three cameras wherein one of the three cameras is coupled to the central arm portion.

16. The system of claim 15 wherein the retracted position comprises a position in which two of the three cameras are moveably retracted into the housing portion.

17. The system of claim 12 wherein the at least one arm portion includes a central arm portion coupled to the housing portion and the plurality of cameras comprise five cameras wherein one of the five cameras is coupled to the central arm portion.

18. The system of claim 17 wherein the at least one arm portion further includes two exterior arm portions and two of the five cameras are coupled to one of the two exterior arm portions and two of the five cameras are coupled to the other of the two exterior arm portions and the deployed position comprises a position in which two of the five cameras are positioned on one side of the housing portion and two of the five cameras are positioned opposite the one side of the housing portion such that each of the five cameras is capable of capturing an image in front of the apparatus.

19. The system of claim 16 wherein the retracted position comprises a position in which four of the five cameras are moveably retracted into the housing portion.

20. The system of claim 12 wherein the plurality of cameras record a real-time video stream of an image in front of the apparatus and the apparatus is coupled to a computer system wherein the computer system includes:
    a view synthesis module for generating a plurality of output video image streams by applying a view synthesis technique to each real-time video streams; and
    a contour extraction module for extracting the image from a physical background.

21. The system of claim 12 wherein the desktop video display comprises a flat-panel display.

22. A retractable camera apparatus comprising:
    a housing portion;
    three arm portions coupled to the housing portion wherein the three arm portions comprise a central arm portion and two exterior arm portions that are capable of being moved between a retracted position and a deployed position; and five cameras wherein one of the five cameras is coupled to the central arm portion, two of the five cameras are coupled to one of the two exterior arm portions and two of the five cameras are coupled to the other of the two exterior arm portions and the deployed position comprises a position in which two of the five cameras are positioned on one side of the housing portion and two of the five cameras are positioned opposite the one side of the housing portion such that each of the five cameras is capable of capturing an image in front of the apparatus and the retracted position comprises a position in which four of the five cameras are movably retracted into the housing portion.

23. The apparatus of claim 22 wherein each of the five cameras records a real-time video stream of an image in front of the apparatus and the apparatus is coupled to a computer system wherein the computer system includes:
a view synthesis module for generating a plurality of output video image streams by applying a view synthesis technique to each real-time video streams; and
a contour extraction module for extracting the image from a physical background.

24. A system for capturing images comprising:
a desktop video display; and
a retractable camera apparatus coupled to the desktop display wherein the retractable camera apparatus comprises:
a housing portion;
three arm portions coupled to the housing portion wherein the three arm portions comprise a central arm portion and two exterior arm portions that are capable of being moved between a retracted position and a deployed position; and
five cameras wherein one of the five cameras is coupled to the central arm portion, two of the five cameras are coupled to one of the two exterior arm portions and two of the five cameras are coupled to the other of the two exterior arm portions and the deployed position comprises a position in which two of the five cameras are positioned on one side of the housing portion and two of the five cameras are positioned opposite the one side of the housing portion such that each of the five cameras is capable of capturing an image in front of the apparatus and the retracted position comprises a position in which four of the five cameras are movably retracted into the housing portion.

25. The system of claim 24 wherein the desktop video display comprises a flat-panel display.

26. A method of utilizing a retractable camera apparatus, the apparatus comprising a housing portion, at least one arm portion coupled to the housing portion wherein the at least one arm portion is capable of being moved between a retracted position and a deployed position; and a plurality of cameras coupled to the at least one arm portion, wherein the retracted position comprises a position in which at least two of the cameras are moveably retracted into the housing portion, the method comprising:
receiving a real-time video stream of an image in front of the apparatus from the plurality of cameras of the at least one arm portion;
utilizing a view synthesis module to generate a plurality of output video image streams by applying a view synthesis technique to the real-time video stream; and
utilizing a contour extraction module to extract the image from a physical background.

27. The method of claim 26 wherein the at least one arm portion includes a central arm portion coupled to the housing portion and the of cameras comprise five cameras wherein one of the five cameras is coupled to the central arm portion and receiving a real-time video stream further comprises receiving a real-time video stream of an image in front of the apparatus from each of the five cameras and applying a view synthesis technique to the real-time video stream comprises applying a view synthesis technique to each of the real-time video streams.

* * * * *